(12) United States Patent
Konkola

(10) Patent No.: US 9,099,908 B2
(45) Date of Patent: Aug. 4, 2015

(54) FAST ACCELERATION REACTION FORCE CANCELLING MOTOR

(75) Inventor: Paul Konkola, West Linn, OR (US)

(73) Assignee: Eyekon Systems LLC, West Linn, OR (US)

(*) Notice: Subject to any disclaimer, the term of this patent is extended or adjusted under 35 U.S.C. 154(b) by 665 days.

(21) Appl. No.: 12/962,604

(22) Filed: Dec. 7, 2010

(65) Prior Publication Data

US 2012/0133249 A1    May 31, 2012

Related U.S. Application Data

(60) Provisional application No. 61/295,684, filed on Jan. 15, 2010.

(51) Int. Cl.
| | |
|---|---|
| H02K 15/00 | (2006.01) |
| H02K 17/44 | (2006.01) |
| H02K 16/02 | (2006.01) |
| G02B 26/10 | (2006.01) |
| G03B 37/02 | (2006.01) |

(52) U.S. Cl.
CPC ............ *H02K 16/025* (2013.01); *G02B 26/105* (2013.01); *G03B 37/02* (2013.01); *Y10T 29/49009* (2015.01)

(58) Field of Classification Search
CPC .... H02K 16/025; G02B 26/105; G03B 37/02; Y10T 29/49009
USPC ................ 310/68 B, 74, 112–114; 318/376; 33/503, 553
See application file for complete search history.

(56) References Cited

U.S. PATENT DOCUMENTS

| | | | |
|---|---|---|---|
| 4,373,147 A * | 2/1983 | Carlson, Jr. ..................... 318/48 |
| 5,005,439 A * | 4/1991 | Jensen et al. ............... 74/570.21 |
| 5,189,806 A | 3/1993 | McMurtry et al. | |
| 6,160,336 A * | 12/2000 | Baker et al. ..................... 310/74 |
| 7,554,237 B2 * | 6/2009 | Clary ............................ 310/114 |
| 2005/0067908 A1 * | 3/2005 | Nai et al. ...................... 310/112 |
| 2005/0231482 A1 * | 10/2005 | Theytaz et al. ............... 345/166 |

FOREIGN PATENT DOCUMENTS

WO    0157473 A1    8/2001

* cited by examiner

*Primary Examiner* — Hanh Nguyen
*Assistant Examiner* — Leda Pham
(74) *Attorney, Agent, or Firm* — The Johnson IP Law Firm; Rodney D. Johnson

(57) ABSTRACT

Particular embodiment of the invention relates to motors that produce reaction force cancellation and are thus well suited to applications where accelerations and reaction forces are relatively large. Such motors are particularly well suited to precision machinery that can benefit from fast accelerations with short settling times. In particular, the motors include movable and counter-movable motor members, where the counter-movable motor member has a reaction mass to counter the reaction force of the first movable motor member.

48 Claims, 10 Drawing Sheets

FAST ACCELERATION REACTION FORCE CANCELLING MOTOR

RELATED APPLICATION

This application claims the benefit of U.S. Provisional Application No. 61/295,684, filed on Jan. 15, 2010, the entire teachings of which are incorporated herein by reference.

GOVERNMENT SUPPORT

The invention was supported, in whole or in part, by a contract number N00014-07-2-0007, awarded by the Office of Naval Research. The Government has certain rights in the invention.

BACKGROUND

There are many applications where a need exists to rapidly accelerate a spindle while having low overhead due to settling times. The acceleration is typically provided by an electric motor. Examples of such applications exist in high-performance precision machinery and surveillance.

Precision machinery such as pick-and-place robots typically operate well with a device that is able to accelerate fast without inducing significant reaction forces. Improved speed, accuracy, and settling time is known to increase throughput and product dimensional quality.

Surveillance applications typically include devices where a sensor or optic needs to rapidly view a wide field-of-view at high resolution. For a given pixel count, the field-of-view decreases with finer resolution. The field of view can be enhanced to provide a wider field-of-view by stepping the sensor in between exposures. A step-stare sensor is therefore typically used to achieve fine resolution and wide field-of-view.

A typical electric motor employs a rotatable rotor element electromagnetically coupled to a stationary stator element. The rotor element is physically coupled to the spindle or other component being accelerated. Electrical drive signals are provided to control the rotation of the rotor relative to the stator element.

SUMMARY

In accordance with particular embodiments of the invention, a motor can be used in a fast acceleration, precision movement system. A counter-rotating motor member promotes cancellation of reaction torques caused by accelerations. The embodiment incorporates the reaction mass into the motor, which achieves weight and size benefits. Precision is enhanced by one set of precision bearing arrangements that references the precision controlled part. Bearings are provided to the counter-rotating motor member to allow it to spin substantially freely and counter the reaction torque of the precision accelerating body.

A particular embodiment of the invention can include a motor assembly and its methods of fabrication, assembly, and operation. The motor assembly can include a base, a first movable motor member, a movable work element, and a second movable motor member.

The first movable motor member can be mechanically isolated from the base by a first bearing arrangement. The movable work element can be secured to the first movable member and moved in response to a reaction force applied to the first movable motor member. The second movable motor member can be disposed relative to the first motor member and mechanically isolated from the base by a second bearing arrangement. Furthermore, the second movable motor member can be substantially free moving and have a reaction mass to counter the reaction force moving the first movable motor member. The motor can further include a torque resistance level on the second movable motor member that exceeds a torque resistance level on the first movable motor member to inhibit runaway of the second movable motor member.

More particularly, the first movable motor member can be electromagnetically coupled to the second movable motor member. The movable motor member can be a rotatable motor member and the counter-movable motor member is a counter-rotatable motor member. The movable work element can be a table or a shaft. The movable work element can incrementally move within a range of movement that is significantly less than one cycle. The movable work element can be particularly useful for step-and-stop and step-and-scan applications where the angular range between steps can be significantly less than 360 degrees, such as less than about 10 degrees.

The motor assembly can also include a position measurement system for measuring the relative positions of the movable work element and the second movable motor member. In particular, the position measurement system can include a first position sensor that measures the position of the movable work element with respect to the base and a second position sensor that measures the position of the second movable motor member with respect to the base. More particularly, the first position sensor can be a precision position sensor.

In addition, a signaling system can be responsive to the position measurement system to provide drive signals to the second movable motor member to affect torque to the movable motor member. The signaling system then can compute commutation phase from the relative positions. The signaling system can also include an electrical energy storage element for storing electrical energy generated by countering the reaction force. The stored electrical energy can then be applied to the drive signals.

A particular embodiment of the motor assembly is embodied in an electromagnetic wave pointing system and its method of fabrication, assembly, and operation. The system includes a structural frame to which the motor assembly is mechanically coupled by the base. An electromagnetic wave pointing device mechanically can then be coupled to the movable work element.

BRIEF DESCRIPTION OF THE DRAWINGS

The foregoing and other objects, features and advantages of the invention will be apparent from the following more particular description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

One objective of the invention is to provide enhanced precision to a motion system with high accelerations by reaction force cancellation where the precision controlled part is of high resonant frequency with repeatable positioning by referencing it to only one set of bearings that are not directly loaded by a reaction mass. It is also an object of the invention to provide a compact, weight saving method of reaction force cancellation. A further object of the invention is to provide for reaction force cancellation at all motor drive frequencies and over unlimited motion ranges for arbitrary pointing profiles. The use of typical motors in fast acceleration applications does not sufficiently meet those objectives.

Accordingly, particular fast acceleration motors in accordance with the invention includes reduced reaction forces. Such motors improve the pointing precision of a device that undergoes fast accelerations and reduces its settling time. Because it is desirable to have maximum time spent imaging or performing a task as opposed to dead times spent moving, higher productivity requires increasing accelerations and the associated reaction forces. Particular embodiments of the invention are applicable to precision applications that generally require 10 microradian or less precision. The accelerations concerned are high where the linear acceleration at the rotating part outer radius are generally greater than 1 g and can exceed 100 g's.

Particular embodiment of the invention relates to motors that produce reaction force cancellation and are thus well suited to applications where accelerations and reaction forces are relatively large. Such motors are particularly well suited to precision machinery that can benefit from fast accelerations with short settling times. In one embodiment, a motor is configured as a rotating table. In a second embodiment, the motor is configured to provide a rotating shaft.

Figure 1:
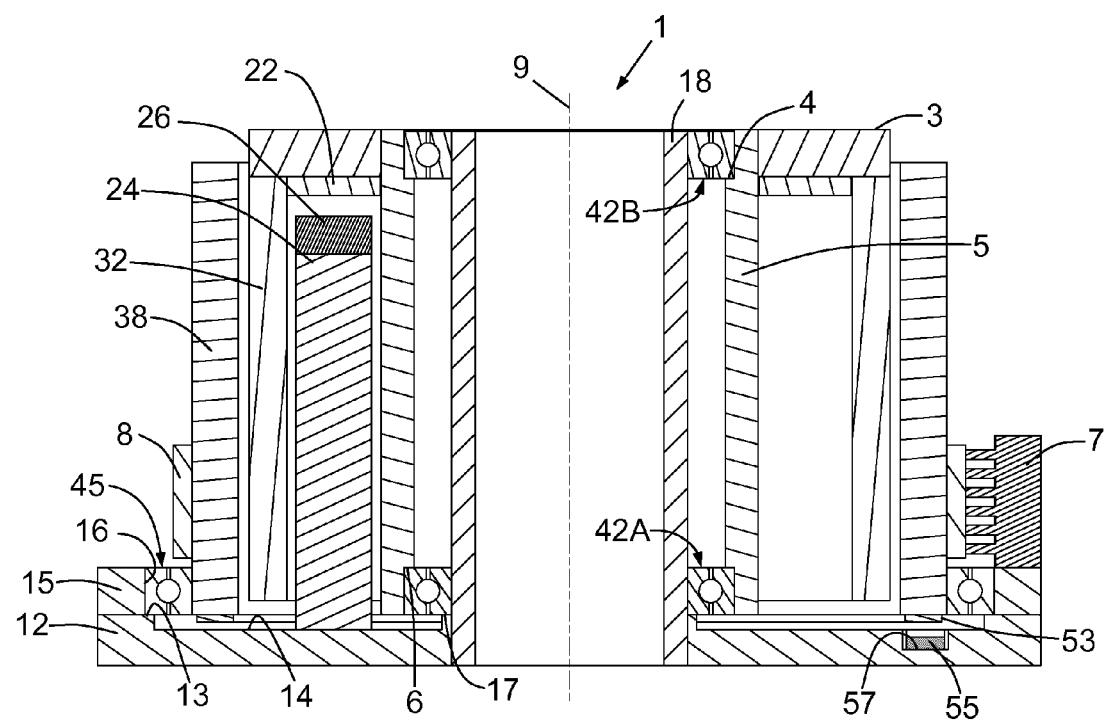
FIG. 1 is a schematic cross-sectional view of a particular motor embodying the principles of the invention.

FIG. 1 is a schematic cross-sectional view of a particular motor embodying the principles of the invention. As shown, a particular embodiment is an electromagnetic motor 1 configured to provide a rotatable table 3 relative to a base 12. The motor 1 is generally constructed around a central axis 9 and comprises a first cylindrical rotatable motor member 32, which is affixed to a rotating table 3, and a second cylindrical rotatable motor member 38. Generally, the second rotatable motor member 38 rotates counter to the rotational direction of the first rotatable motor member 32. Torque is produced by driving the motor with drive signals.

As shown, a shoulder 15 is fastened to the base 12 and provides a sunken or depressed circular motor bed surface 14 with a circumferential bearing wall 16. A central motor post or axle 18 is fastened to the base 12 and extends upwardly from the motor bed surface 14. Similarly, the rotatable table 3 includes a downwardly extending mounting hub 5 dimensioned to rotationally receive the motor axle 18. Also shown are a lower table bearing member 42A, an upper table bearing member 42B, and a motor bearing member 45. The hub 5 includes a lower bearing shoulder 6 and an upper bearing shoulder 4 that provide precision locating references for the lower table bearing 42A and the upper bearing shoulder 42B, respectively. Similarly, the base 12 includes a motor bearing shoulder 13 and a lower table bearing shoulder 17 that provide precision locating references for motor bearing 15 and the lower table bearing 42A, respectively.

More particularly, the table bearings 42A, 42B are disposed between the rotating table mounting hub 5 and the axle 18 to allow for rotary motion of the rotating table 3 about the base 12. The motor bearings 45 are disposed between the counter-rotating motor member 38 and the base bearing wall 16 to allow for rotary motion of the counter-rotating member 38 relative to the base 12.

The drive signals are provided through a slip ring brush or cable connection 7, which is shown schematically, to the slip ring or cable wrap 8. The slip ring or cable wrap 8 is integrated with the counter-rotating motor member 38 to provide a compact device. The slip ring 8 is integrated by encapsulation, interference fitting, retaining compound, or slip fitting with retaining rings and is precise to minimize the run out. Alternately, a cable wrap can be used which allows for cable bending over a finite range of angular motion. The circular motor bed surface 14 has clearance with respect to the rotating motor member 32 and the counter-rotating motor member 38.

In accordance with a particular embodiment, the rotating table 3 is precision controlled, typically to better than 10 microradians, with respect to a reference frame, which can be the base 12 or an inertial reference.

To determine precise position, position sensing systems are coupled to each of the rotatable motor member 32 and the counter-rotatable motor member 38. A first position sensor reference ring 22 and a first position sensor 26 provide the precision position of the rotating table relative to the base 12. A position sensor mount 24 affixes the first position sensor 26 to the base 12. Likewise, a second position sensor reference ring 53 is affixed to the counter-rotating motor member 38, and a corresponding second sensor 55 is mounted within a well 57 of the motor base 12 to provide the precision position of the counter-rotating table 38 relative to the base 12. The relative position of the counter-rotating member 38 to the rotating member 32 is determined by the difference in the measurements provided by the rotating sensors 26 and the counter-rotating sensor 55, because both are relative to the base.

The position sensors 26, 55 can be an optical encoder, magnetic encoder, electrical, or otherwise. The precision of the first position sensor 26 directly affects the precision achievable for control. In the particular embodiment, the first position sensor 26 is a high resolution, high count rate optical encoder. The corresponding sensor reference 22 is a fine pitched scale printed on a rigid substrate. The second position sensor 55 should have enough resolution to map the commutation currents for precise torque control. In the particular embodiment the counter-rotating member position sensor reference 53 is a lower resolution optical encoder patterned on a thin film typically less than 0.01" thick and it is attached to the counter-rotating member 38. This placement limits the need for extra signals required through the slip ring or cable paths 7 and 8. Alternately, the counter rotating motor member 38 can be equipped with a Hall Effect sensors to detect the relative position, however additional signals will be required through the slip ring or cable paths 7 and 8. The relative position provides the commutation phase for the drive signals.

The torque produced by the motor is equal but opposite on the rotating motor member 32 and the counter-rotating motor member 38 by Newtonian reaction forces. As shown, the rotary motor's reaction forces can alternately be described as "reaction torque." The reaction torque to the base 12 is substantially decoupled from the base 12 because the counter-rotating motor member 38 is allowed to spin substantially freely by use of the motor bearings 45.

The removal of the reaction force disturbance induces favorable dynamics for precision control. Moreover, the position measurement sensor of the primary moving part does not experience dynamic response due to the fast accelerating parts. This improves the control dynamics and allows faster settling time than systems that do not cancel the reaction forces. Additionally, the motor base 12 can be connected to a frame coupled to instruments that are sensitive to acceleration. The removal of reaction forces reduces instrument errors by inhibiting vibrations of the base 12 and the parts that connect to the base 12. Furthermore, the base 12 can be connected to the ground or to a moving platform such as a ground vehicle, boat, or aircraft by using vibration isolation mounts. The vibration isolation will have low natural frequency and generally has significant flexibility in response to the motor reaction forces. The reaction force cancelling motor will help to prevent rocking of the base 12 and the associated accelerations. The rocking would disturb the instruments and increase settling times. The rocking could also cause damaging shock forces on the system by the bottoming-out of the isolation system.

Reduced reaction forces on the base allow the further benefit of allowing reduced structure and weight of the base 12 and any connecting parts. Moreover, the reaction force compensated motor substantially eliminates rocking of the machine base and the ratio of moving inertia to non-moving inertia can be made larger than in the prior art. More specifically, in prior art, base assemblies are typically many times the weight of the moving parts for the purpose of limiting accelerations in response to reaction forces. Those prior art bases are commonly made of granite or cast iron. With the reaction force compensating motor, the base accelerations are substantially eliminated and therefore the machine base does not need to be heavy to limit its accelerations in response to reaction forces. As such, the base (and other non-moving parts) can be made from low density materials such as composites or aluminum alloys, with lightweight construction such as truss or egg-crate structures.

While friction in the motor bearings 45 will contribute to transmission of reaction forces to the base 12, any friction present in the motor bearings 45 and the table bearings 42A, 42B can result in net cancellation of the friction-absorbed reaction forces on the base 12 if the friction torques are balanced. Furthermore, the friction torque can be low not only due to the use of low friction bearings but also because a lightly loaded table 3 will only require light loading of the bearings. Because the frictional forces will be much less than otherwise un-cancelled reaction forces of the fast accelerating rotating table 3 and the frictional forces of the table bearings 42A, 42B and the motor bearings 45 can cancel, the invention provides substantial cancellation of the reaction torque.

Furthermore, special applications can use very low friction bearings such as air bearings or magnetic bearings. The table bearings 42A, 42B are of sufficient precision for the application requirements, while the motor bearings 45 can be of a degraded specification because imperfections in repeatability of the motor bearing 45 do not directly translate into positioning error of the rotating table 3. However, the motor bearing 45 should have sufficient repeatability such that fluctuations of motor torque with gap do not hinder the precision of the torque control. Furthermore, the bearing run-out should allow acceptable wear of the slip ring brush or cable connection 7 and the slip ring or cable wrap 8.

In practice, the counter-rotating resistance torque caused by friction or otherwise is higher than the rotating table resistance torque such that the counter-rotating motor member 38 is not allowed to run away, for instance, during constant angular velocity rotary motion. In practice, the friction to the counter-rotating member 38 can be controlled by the preloading, bearing lubrication, and slip ring friction. Therefore, in the particular embodiment no additional mechanism to provide the resistance torque for run-away prevention is necessary. However, a component to provide additional resistance torque to the counter-rotating member 38 can be incorporated. This component can be mechanical, electro-magnetic, or hydraulic braking.

As shown, the base 12, shoulder 15, and axle 18 are separate parts that are fastened together to form a non-movable structure. Separating the axle 18 from the base 12 reduces the amount of machining and material needed during manufacture. The axle 18 and base 12 would be best attached by interference fit and an adhesive compound (depending on the materials and tolerances chosen it could be retaining compound, cyanoacrylate, or epoxy). After attachment, the precision surfaces are then machined.

Although not shown, the base 12 can be removably attached to another base plate to allow servicing the metrology before the need to attach the rotating motor member 32. In other words, the rotating motor member 32 can be made removable without having to disassemble the table bearings 42A, 42B. For the highest repeatability and compactness, the table bearings 42A, 42B are preloaded and bonded in place, as opposed to using slip fits or lock nuts, therefore they are not easily removable. Bonding the table bearings 42A, 42B is acceptable because the bearing life, with proper shields and minimal service, can be decades long.

The rotating motor member 32 can also be made removable through its attachment to the rotatable table 3. When the rotating motor member 32 is removable, it allows access to the metrology head 26 for alignment or replacement. Also, in certain applications, there can be a slip ring in the same cavity as the metrology head and access to its brushes would be desirable. It is also possible that the second base plate would not be used if the metrology head 26 and (other components such as a second slip ring) were known to have a sufficiently long lifetime.

Separating the mounting shoulder 15 from the base 12 allows the counter-rotating motor member 38 to be built and removed as a modular assembly. Such an arrangement offers some significant manufacturing and servicability benefits, but it is not a requirement.

The motor 1 is compact and makes use of the secondary moment of inertia present in a motor stator for the counter-rotating motor member 38. In high angular acceleration applications the combined secondary moment of inertia of the rotating table 3 and co-moving parts are typically within a factor of ten of the secondary moment of inertia of the rotating motor member 38. For the highest angular acceleration applications, this secondary moment of inertia ratio can be one or less. One skilled in the art will recognize that the secondary moment of inertia of a motor stator and the secondary moment of inertia of a motor rotor will be similar. Therefore the secondary moment of inertia of the counter-rotating motor member 38 is typically within a factor of ten of the rotating secondary moment of inertia. The reaction forces therefore will induce angular accelerations of the counter rotating motor member 38 within a factor of ten of the angular accelerations of the rotating motor member 32.

While the relative speed of the counter-rotating motor member 38 acts to increase the back electromotive force on the motor with the corresponding increase in drive signal voltage, the angular velocity attained during stop-and-go applications such as step-stare or pick-and-place is not typically limiting. In fact, the higher electromotive force is beneficial to fast decelerations. It will also benefit efficient recovery of the kinetic energy by use of a regenerative amplifier because voltages will be higher with respect to the forward voltage drop in transistors and diodes that are used in this amplifier. Losses due to eddy current losses can be minimized by well known motor design practices such as laminations and synchronous drive.

Figure 2:
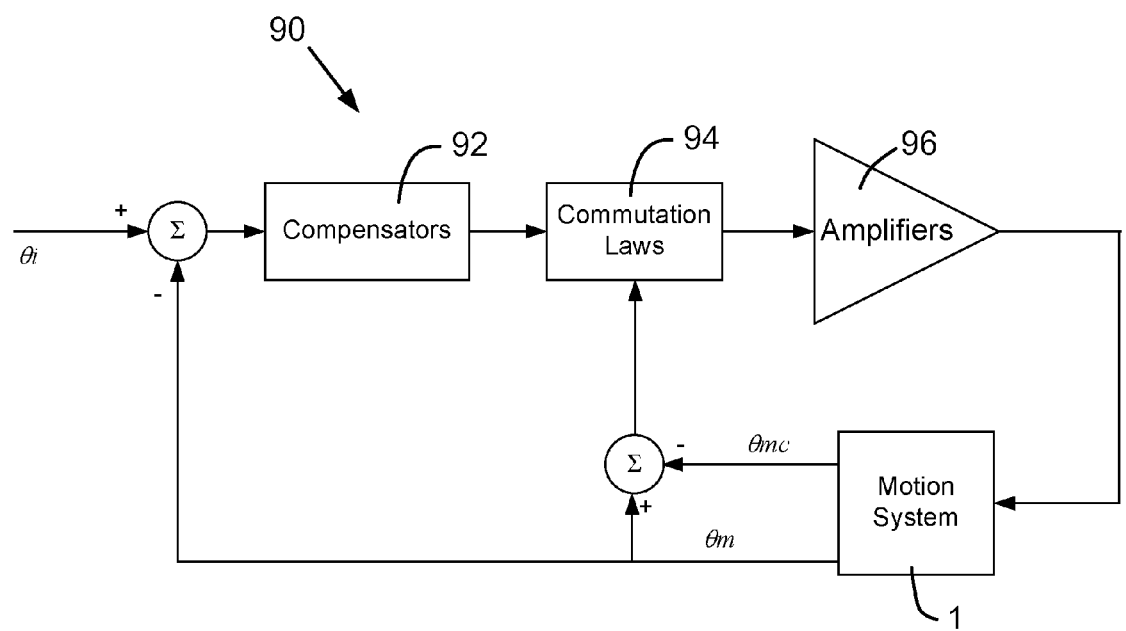
FIG. 2 is a block diagram of a simplified motor control system for the motor of FIG. 1.

FIG. 2 is a block diagram of a simplified motor control system for the motor of FIG. 1. As described above, the motor 1 provides the relative angular position of the table, θm, and the counter-rotating motor member, θmc. An input reference angle, θi, representing the desired angular position of the table is provided. The position of the table θm is subtracted from the input reference angle θi to yield the desired angle of movement. That result is processed by a compensator 92, which computes the torque necessary to rotate the table by the desired angle of movement. Commutation laws 94 are then applied to the computed torque and the difference between the table angle θm and the counter-rotating motor member angle θmc to yield commutation commands, which are converted to drive signals by an amplifier 96. Those commutation signals are provided to the motor 1 to actuate the motion.

Returning to FIG. 1, it should be noted that the particular embodiment uses only one set of precision bearings that references the shaft 5 to the non-moving axle 18, because over stacked bearings arrangements of the prior art would reduce precision. The reaction mass weight is not supported by the rotating table bearings 42A, 42B and therefore does not reduce the resonant frequency of the rotating table-to-base connection. In the particular embodiment, the motor bearing 45 is a 4-point contact or crossed roller bearing, where only a single bearing is required. However, the motor bearing 45 can be pairs of angular contact or Conrad bearings or an air bearing, magnetic bearing, fluid bearing, or otherwise.

In the particular embodiment the position sensor reference 22 is located on the rotating table 3 and the position sensor 26 references the base 12. This limits the need to provide signals to the rotating table 3. However, the position sensor reference 22 could alternately be located on the base 12 and the position sensor 26 could be located on the rotating table 3. An additional slip ring or cable can be used to provide signals to the rotating table 3 for the position sensor or other sensors specific to the application. In some applications where the moving part requires a slip ring, putting the current driven part of the motor on the moving part may be preferred as it would eliminate an additional slip ring for the counter rotating motor member 38. However, space and frictional resistance are also considerations.

In the particular embodiment, the motor 1 is electromagnetic but the principles of this invention also apply to actuators of other varieties such as piezoelectric or hydraulic. The principles of this invention also apply to linear motors. Instead of rotary components, linear components are used for the motors, bearings, position sensors, position sensor references, and run-away prevention forces. Thus, the motors can be thought of as movable and counter-movable. Linear applications also benefit from particular aspects of the invention because the center of gravity does not substantially shift with motion of the movable and counter-movable members. Therefore, gravity induced rocking of the base can be substantially eliminated.

The travel of the counter-moving member in linear applications places requirements on the linear extent of a system and embodiments of the invention can be especially beneficial in applications where the travel is relatively small compared to the preferred overall system size or when the ratio of the moving to non-moving inertia is on the order of one or less. Furthermore, unlike rotary applications where angular positioning may allow continuous spin, the positioning range is finite in practical linear applications. Therefore, in linear applications, the nominally small resistance force for preventing run-away of the counter-moving motor member can be controllable to obviate not only the possibility of velocity run-away, such as may occur during constant velocity movement, but also positioning run-away such as might occur during periodic profiles with misbalanced forward and backward resistance forces.

The impact of the invention on machine accuracy can be modeled for illustration purposes.

Figure 3:
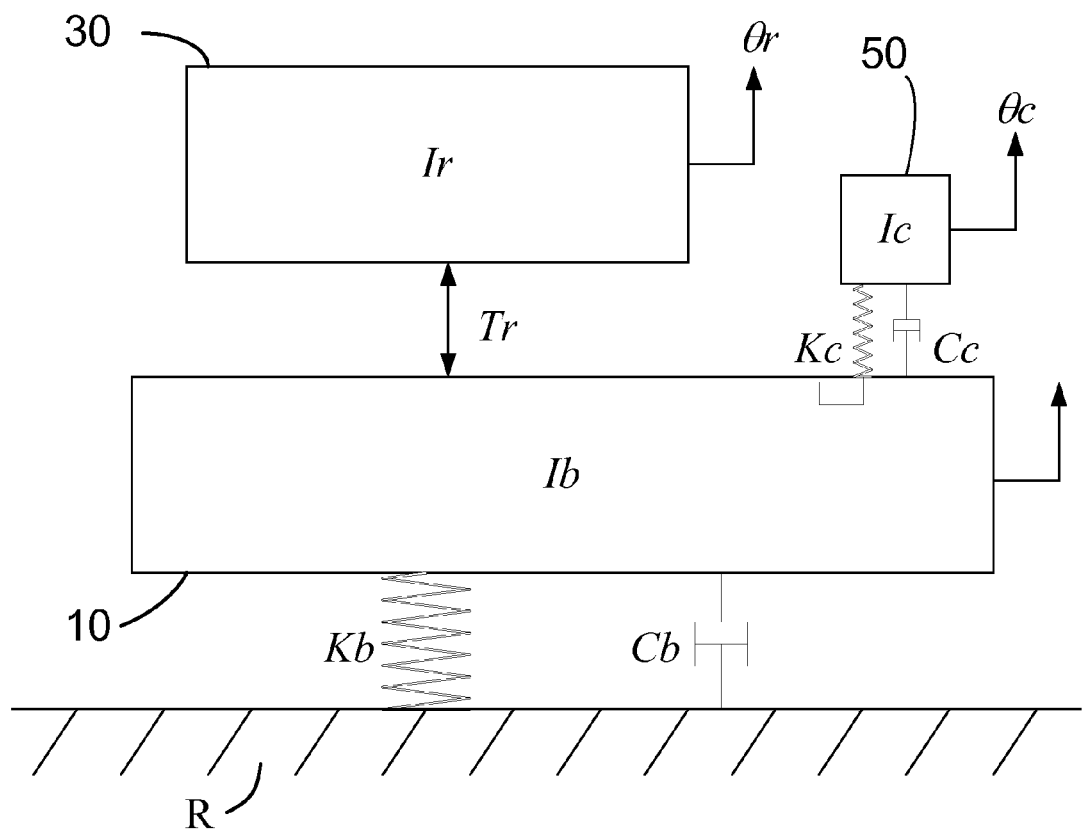
FIG. 3 is a schematic of a simplified model used to illustrate component errors caused by reaction forces.

FIG. 3 is a schematic of a simplified model used to illustrate component errors caused by reaction forces. The components of the model are drawn as a one dimensional block diagram. Here a rotor 30 has secondary moment of inertia, Ir, and is driven by a motor torque, Tr. The motor reaction torque, −Tr, is transferred to a base 10 with secondary moment of inertia, Ib, when there is no reaction force compensation. The base 10 is coupled to a non-accelerating reference frame R by means of a resonant structure with spring constant, Kb, and damping constant, Cb, respectively. A representative component 50 whose motion causes error on the machine has a secondary moment of inertia, Ic, and a resonant structure to the base 10 with spring constant, Kc, and damping constant, Cc. This component 50 can be a work-piece, mirror, sensor, or mechanism. While more than one component of the machine may contribute to error if displaced due to reaction forces, modeling one component can adequately convey the benefit of reaction force compensation.

The equations of motion written in state-variable form (Franklin, Powell) for a system without reaction force compensation are:

$$\begin{bmatrix} \theta r' \\ \theta r'' \\ \theta b' \\ \theta b'' \\ \theta c' \\ \theta c'' \end{bmatrix} = \begin{bmatrix} 0 & 1 & 0 & 0 & 0 & 0 \\ 0 & 0 & 0 & 0 & 0 & 0 \\ 0 & 0 & 0 & 1 & 0 & 0 \\ 0 & 0 & -\omega b^2 - Rcb\omega c^2 & -2(\omega b\zeta b + Rcb\omega c\zeta c) & Rcb\omega c^2 & 2Rcb\omega c\zeta c \\ 0 & 0 & 0 & 0 & 0 & 1 \\ 0 & 0 & \omega c^2 & 2\omega c\zeta c & -\omega c^2 & -2\omega c\zeta c \end{bmatrix} \begin{bmatrix} \theta r \\ \theta r' \\ \theta b \\ \theta b' \\ \theta c \\ \theta c' \end{bmatrix} + \begin{bmatrix} 0 \\ 1 \\ 0 \\ -Rrb \\ 0 \\ 0 \end{bmatrix} \frac{Tr}{Ir} \quad \text{(Equation 1)}$$

Where the variables are defined $$\omega b = \sqrt{\frac{Kb}{Ib}}, \omega c = \sqrt{\frac{Kc}{Ic}}, \zeta b = \frac{Cb}{2\sqrt{IbKb}}, \quad \text{(Equation 2)}$$

$$\zeta c = \frac{Cc}{2\sqrt{IcKc}}, Rrb = \frac{Ir}{Ib}, Rcb = \frac{Ic}{Ib}$$

The angles θr, θb, and θc are defined as the angle with respect to the rest frame for the rotor, base, and component respectively. The angular error is defined as the angular motion of the component relative to the base or θc−θb. The transfer function for the error with respect to the angular accelerations of the rotor is given by $$\frac{\theta c(s) - \theta b(s)}{\theta r''(s)} = \frac{Ir[\theta c(s) - \theta b(s)]}{Tr(s)} = \frac{Rrbs^2}{(s^2 + 2\omega b\zeta bs + \omega b^2)(s^2 + 2\omega c\zeta cs + \omega c^2) + Rcbs^2(2\omega c\zeta cs + \omega c^2)} \quad \text{(Equation 3)}$$

The parameter s is the Laplace transform variable, which is equal to jω. Here j is the square root of negative one and ω is the frequency in units of radians per second. The base natural frequency is typically low to provide vibration isolation and usually is on the order of ≈2-20 Hz. For fast angular accelerations in step-scan and step-settle applications, the frequency of angular accelerations can be greater than the base natural frequency. One case of practical interest is when Rcb is much less than one and the angular acceleration frequencies of interest are less than the component natural frequency but greater than the base natural frequencies. With these conditions the error transfer function can be estimated as $$\frac{\theta c(s) - \theta b(s)}{\theta r''(s)} \approx \frac{Rrb}{\omega c^2} \quad \text{(Equation 4)}$$

Thus, the magnitude of the error with respect to rotor angular accelerations is proportional to the ratio of rotor to base secondary moment of inertia and inversely proportional to the component natural frequency squared. Systems with significant errors due to reaction force therefore can have a combination of small error allowances, high angular accelerations, large ratio of rotor to base secondary moment of inertia, and low component natural frequency. Errors that are of practical interest can be graphically illustrated.

Figure 4:
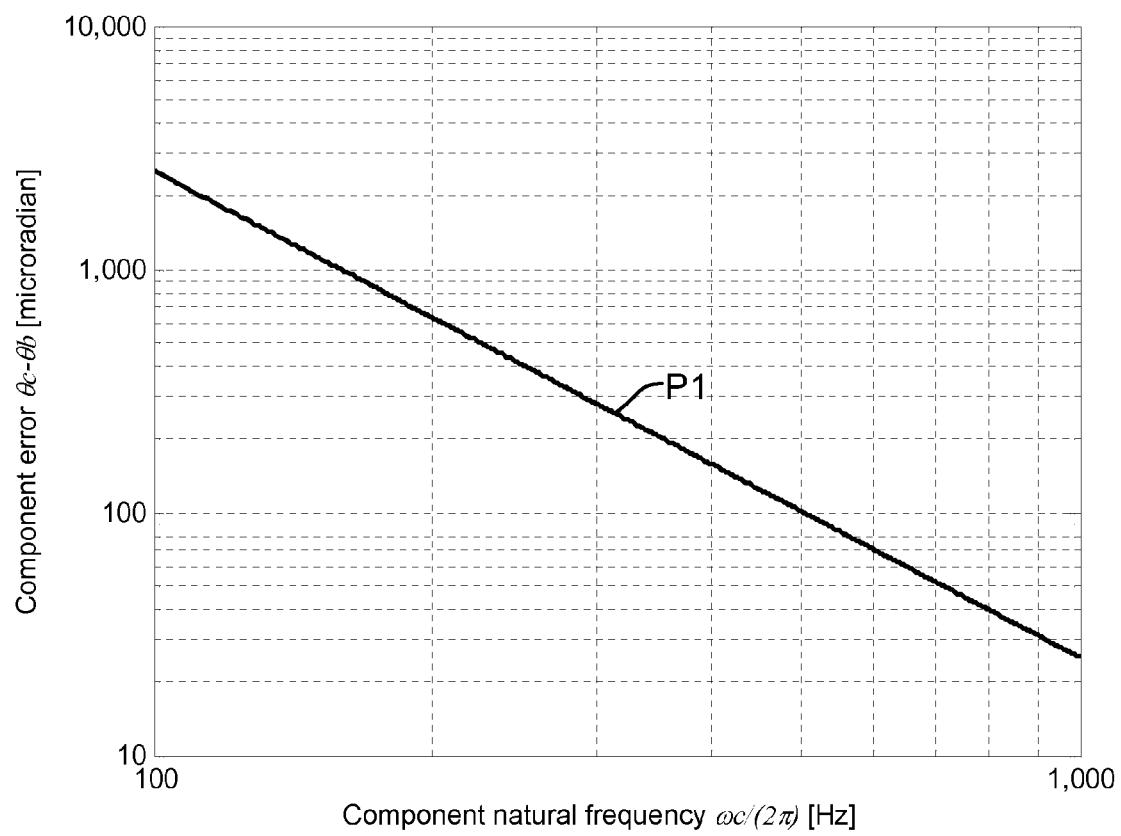
FIG. 4 is a plot of the error for an example non-reaction force compensated system due to reaction forces using the model of FIG. 3.

FIG. 4 is a plot of the error for an example non-reaction force compensated system due to reaction forces using the model of FIG. 3 with parameters as now described. The plot P1 shows the component error, θc−θb, with respect to the component natural frequency in hertz, which is plotted over a representative range of 100 Hz to 1000 Hz. The secondary moment of inertia ratio, Rrb, is set equal to one and represents a system where the base is not allowed to be large due to limitations such as weight constraints. The rotor angular accelerations are set to 1000 rad/s$^2$ and the rotor to base secondary moment of inertia ratio is assumed to be one for this example.

For surveillance applications where the error allowances can be micro-radian level, the specified precision would not be achievable without reaction force compensation even when the component natural frequency is 1000 Hz. More specifically, at 100 Hz component natural frequency the error magnitude is 2500 micro-radian and at 1000 Hz it is 25 micro-radians, which is well above micro-radian level performance.

Particular embodiments of the invention, in contrast, have substantially no reaction force on the base due to the driving torque, but instead the reaction force is on the counter-rotating motor member. The base will substantially not experience reaction forces from the rotor angular accelerations and errors due to component vibration on the base will be substantially nulled. While the benefit of reaction force compensation on component errors has been illustrated with a simple model and representative parameters, the benefit also extends to more complex dynamics and multi-dimensional systems. Particular embodiments of the invention also offer improved control dynamics.

Figure 5:
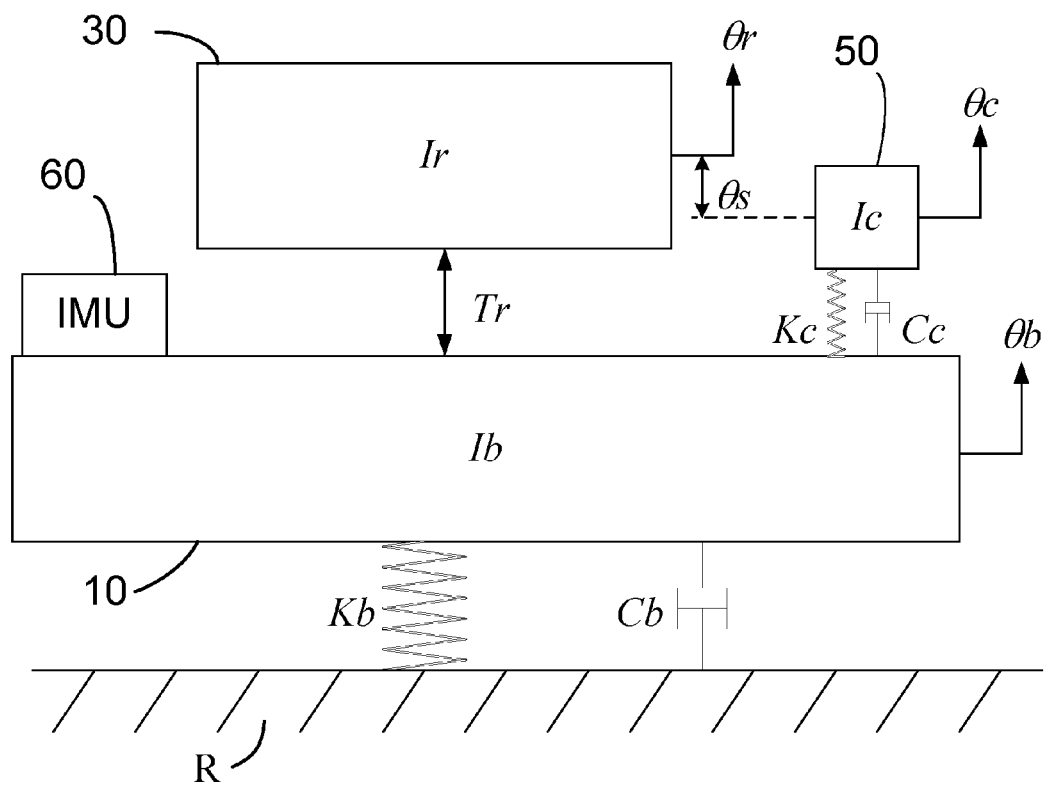
FIG. 5 is a schematic of a simplified model used to compare control with and without reaction forces.

FIG. 5 is a schematic of a simplified model used to compare control with and without reaction forces. The rotor to base motion is sensed using a measurement of the relative displacement between the rotor 30 with secondary moment of inertia Ir and the component 50 with secondary moment of inertia k. This sensor provides the measurement, θs, of the rotor angle with respect to the angular position sensor where θs=θr−θc. The sensor can be an optical encoder or magnetic angular position sensor. Furthermore the base motion is measured with an inertial measurement unit (IMU) 60 that is fixed to the base 10. The IMU 60 provides measurement of the base motion with respect to the inertial rest frame. The IMU 60 for candidate applications is likely to be high performance, such as those containing fiber optic gyroscopes or ring laser gyroscopes. High performance IMUs can have significant size, weight, power, and signaling concerns. Therefore it is preferred in some applications to package the IMU on the base instead of directly on the moving parts. The rotor is controlled relative to the inertial rest frame R such that the measured position relative to the rest frame is θm=θs+θb.

The modeled dynamics are identical to those in Equation 1. The open loop transfer function of the measured position relative to the control input torque Tr and multiplied by the rotor secondary moment of inertia is given by $$\frac{Ir[\theta m(s)]}{Tr(s)} = \frac{(s^2 + 2\omega b\zeta bs + \omega b^2)(s^2 + 2\omega c\zeta cs + \omega c^2) + Rcbs^2(2\omega c\zeta cs + \omega c^2) - Rrbs^4}{s^2[(s^2 + 2\omega b\zeta bs + \omega b^2)(s^2 + 2\omega c\zeta cs + \omega c^2) + Rcbs^2(2\omega c\zeta cs + \omega c^2)]}. \quad \text{(Equation 5)}$$

Equation 5 is the transfer function of the open loop plant dynamics, which can be plotted.

Figure 6:
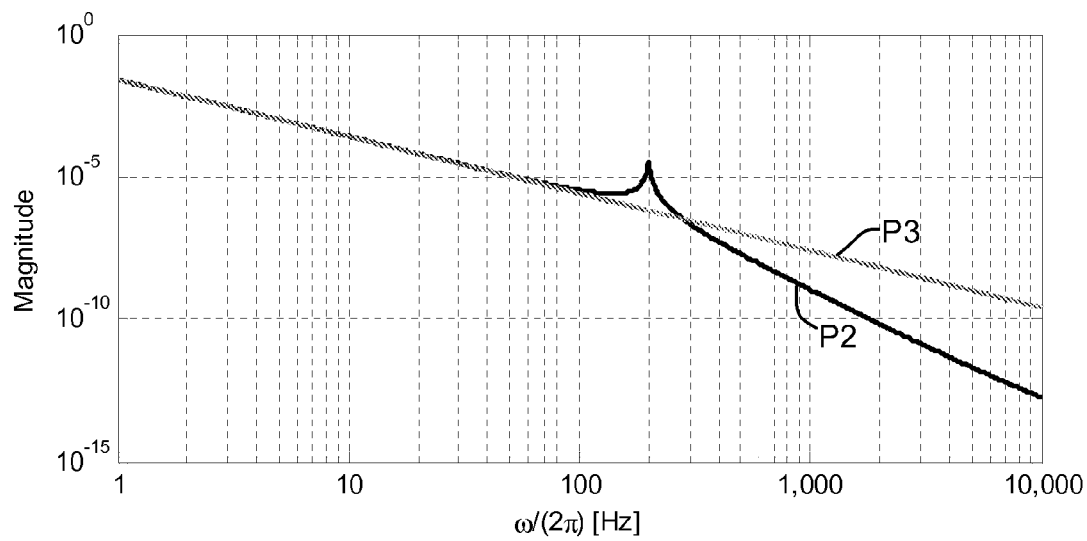
FIG. 6 is a graphical representation of the magnitude of the transfer function of the open loop plant dynamics with and without reaction force compensation using the model of FIG. 5.

FIG. 6 is a graphical representation of the magnitude of the transfer function of the open loop plant dynamics with and without reaction force compensation using the model of FIG. 5. The magnitudes are plotted from 1 to 10,000 Hz. The magnitude without reaction force compensation is plotted as a solid line P2 while the magnitude with reaction force compensation is plotted as a dotted line P3.

Figure 7:
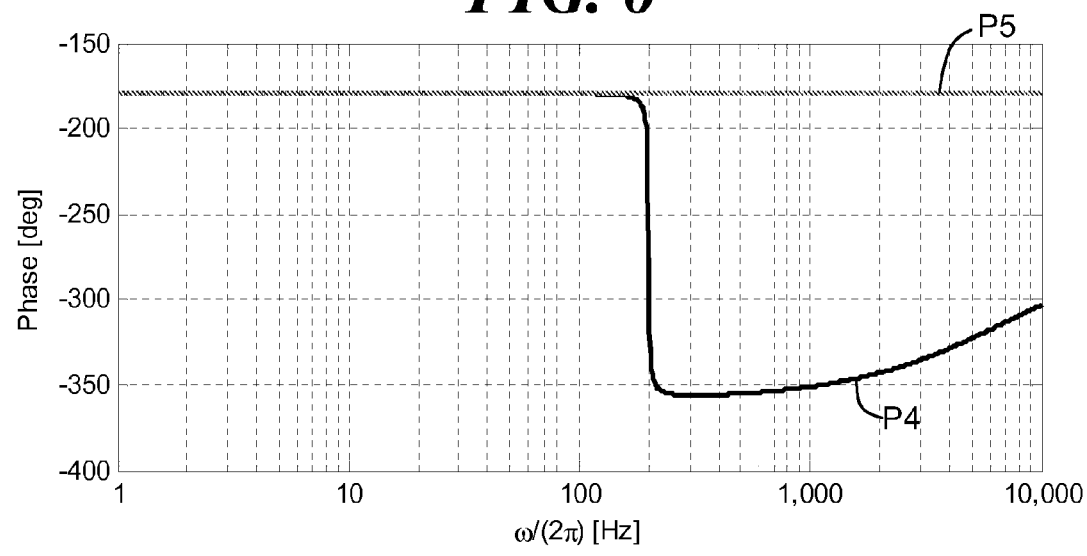
FIG. 7 is a graphical representation of the phase of the transfer function of the open loop plant dynamics with and without reaction force compensation using the model of FIG. 5.

FIG. 7 is a graphical representation of the phase of the transfer function of the open loop plant dynamics with and without reaction force compensation using the model of FIG. 5. The phases are also plotted from 1 to 10,000 Hz. The phase without reaction force compensation is plotted as a solid line P4 while the phase with reaction force compensation is plotted as a dotted line P5.

As shown, with reaction force compensation the base experiences no reaction forces due to Tr and θc=θb. The open loop transfer function becomes $$\frac{Ir[\theta r(s) - \theta c(s) + \theta b(s)]}{Tr(s)} = \frac{Ir\theta r(s)}{Tr(s)} = \frac{1}{s^2}. \quad \text{(Equation 6)}$$

The parameters used in the plotting of Equation 5 are $\omega b/(2\pi)$=10 Hz, $\zeta b$=0.1, $\omega c/(2\pi)$=200 Hz, $\zeta b$=0.01, Rcb=0, and Rrb=1. While the vibration isolation resonance is representative of a system with vibration isolation, the change in the transfer function near the vibration isolation resonance is small. Meanwhile, the change of most interest occurs near the sensor to base natural frequency. Here there is a phase drop that brings the phase less than −180 degrees. This phase drop reduces stability at higher frequencies with associated drawbacks of limited disturbance rejection, reduced robustness, and excitation of vibration modes. Explicit feedback techniques such as notch filtering also can be thwarted due to the un-modeled dynamics of the real continuum mechanical system, the necessity for larger actuator torques, and errors due to displacement of the sensor and instruments with respect to the base. The reaction force compensated system is preferred for control purposes because it can be easily stabilized with large bandwidth, can have improved disturbance rejection and robustness, and does not result in component errors on the base.

Figure 8:
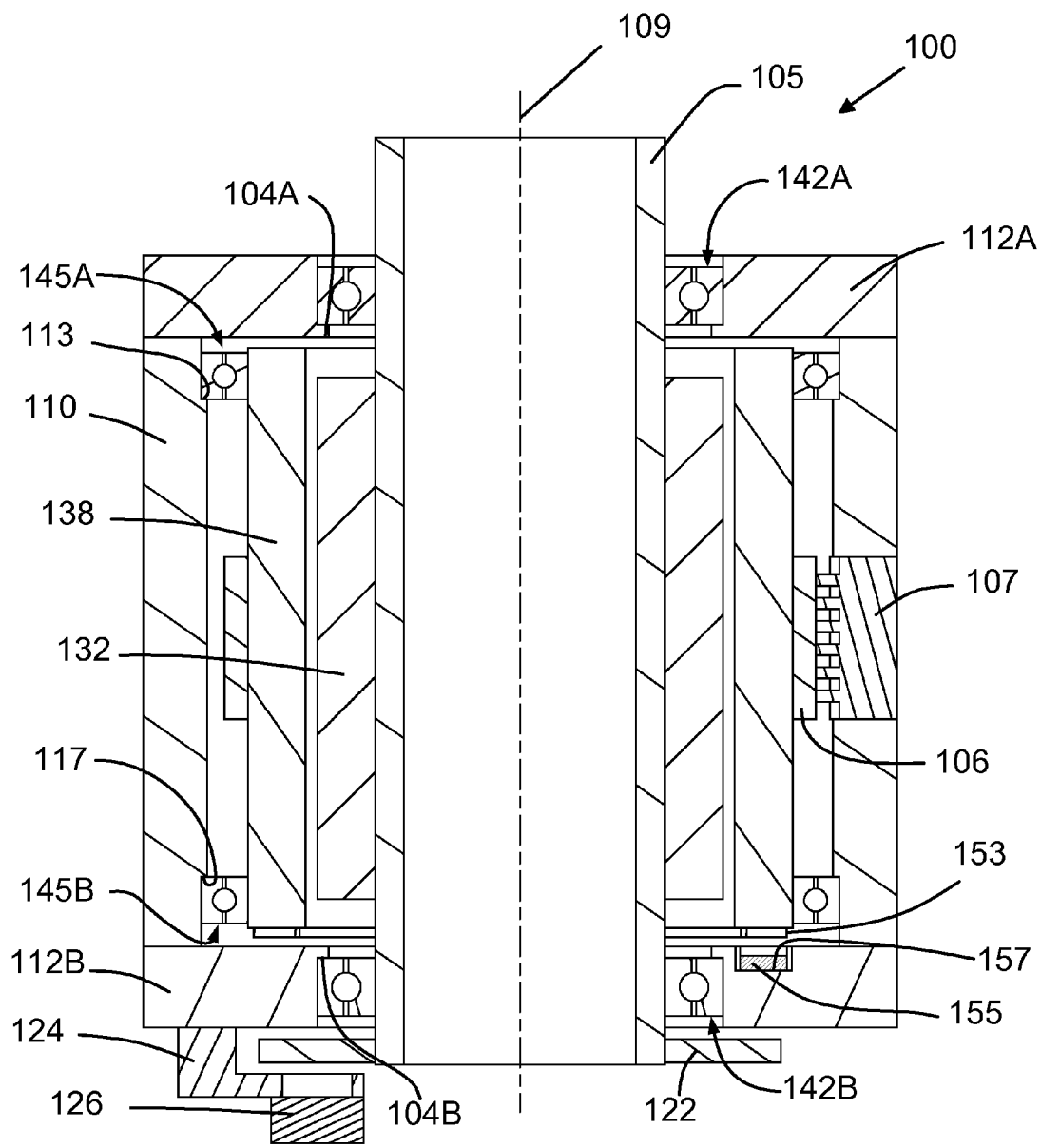
FIG. 8 is a schematic cross-sectional view of another particular motor embodying the principles of the invention.

FIG. 8 is a schematic cross-sectional view of another particular motor embodying the principles of the invention. The particular motor 100 is configured to provide a rotating shaft 105, which is centrally disposed about a central motor axis 109 and mechanically fixed to a rotating motor member 132. This embodiment encloses the moving parts in a housing 110 and endplates 112A and 112B. The mounting options for this embodiment are relatively versatile because a large percentage of the external surfaces are non-moving. Furthermore, two sets of motor bearings 145A and 145B are shown, which may be of the angular contact or Conrad type.

As shown, bearings 142A, 142B provide for rotary motion of the shaft 105 and are secured to motor endplates 112A, 112B. Bearing shoulders 104A and 104B are depicted and provide precision locating references for these bearings. A rotating motor member 132 is affixed to the rotating shaft 105 and torque is provided by driving a counter-rotating motor member 138 with drive signals. The signals pass through a slip ring brush or cable connection 107 and a slip ring or cable wrap 106. The counter-rotating motor member 138 is allowed to spin substantially freely by use of motor bearings 145A, 145B affixed to the housing 110. Bearing shoulders 113 and 117 are depicted and provide precision locating references for these bearings.

A first position sensor 126, a position sensor mount 124, and first position sensor reference ring 122 are provided for sensing the orientation of the shaft 105. A subsystem is also provided to sense the orientation of the counter-rotating motor member 138 relative to the rotating motor member 132 for commutation purposes. A second position sensor reference ring 153 and a second corresponding sensor 155 is mounted on the end plate 112B in a depressed well 157. The relative position of the counter-rotating member 138 to the rotating member 132 is determined by the difference in the measurements provided by the two sensors, 126 and 155, which are relative to the base.

The principles of the first embodiment for reaction torque cancellation apply to this embodiment. The configuration of this embodiment is particularly useful for rotary shaft applications and the first embodiment is particularly useful for rotary table top applications.

As previously discussed, embodiments of the invention are relevant for applications that have a combination of small error allowances, high angular accelerations, large ratio of rotor to base secondary moment of inertia, and low component natural frequency. A motor utilizing the principles of the invention can operate a rotating table or shaft with essentially unlimited angular motion and is recognized as being particularly useful for step-and-stop and step-and-scan applications where the angular range between steps can be significantly less than 360 degrees, such as less than about 10 degrees. Examples of particular systems including the motor embodiments include electromagnetic wave pointing systems, including optical pointing systems having movable optical elements and microwave pointing systems having movable microwave antennas. Those of ordinary skill in the art will recognize other systems that can incorporate a motor in accordance with the invention, such as robotic and other mechanical systems.

Figure 9:
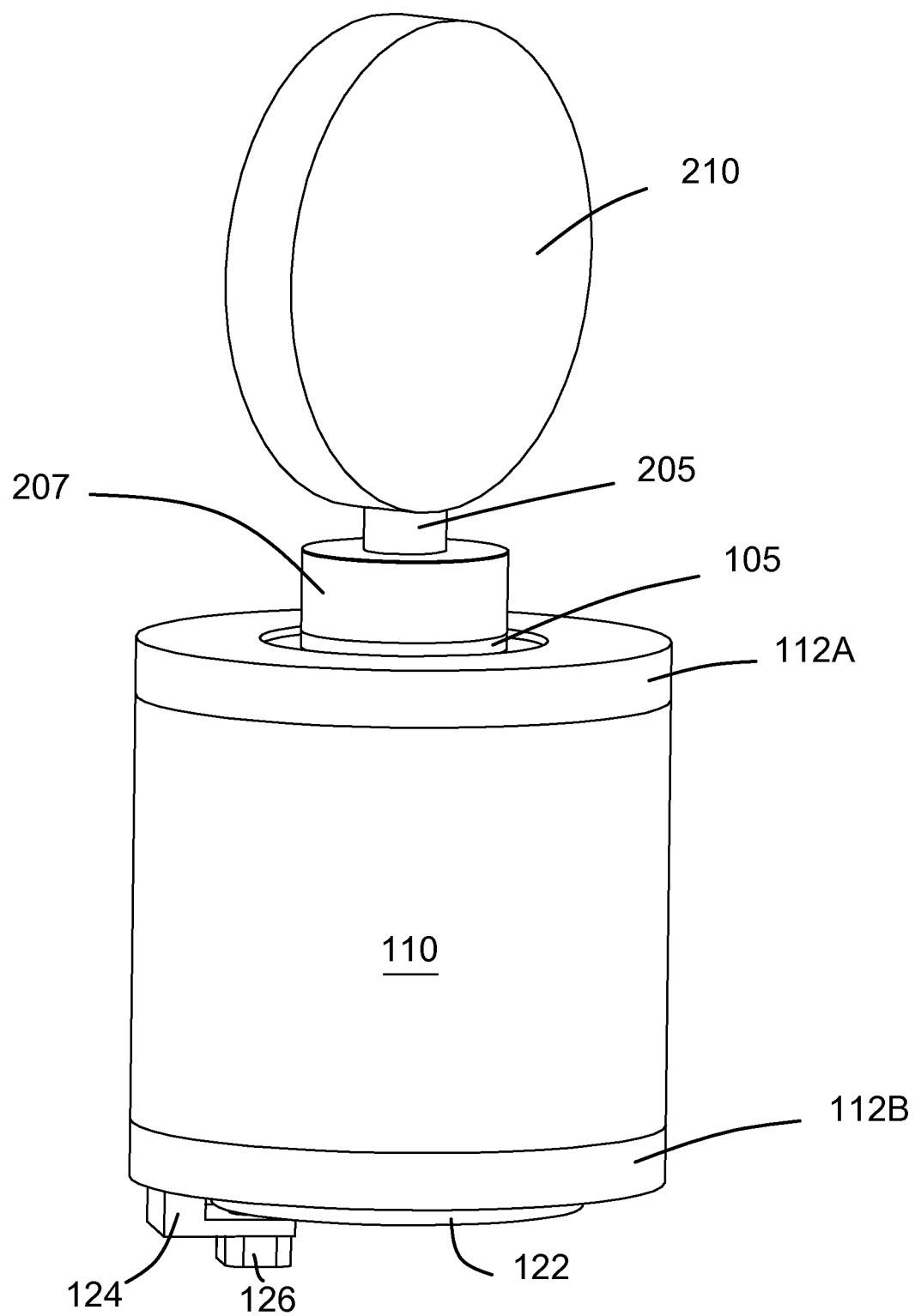
FIG. 9 is a perspective view of a simple implementation of the second embodiment where the motor is used to drive a mirror.

FIG. 9 is a simple implementation of the second embodiment where the motor is used to drive a mirror in one angular degree of freedom. The mirror 210 is shown attached to connector 205, which couples to the shaft 105 by a rigid shaft coupling 207. For high angular acceleration applications, the motor rotating and counter-rotating secondary moment of inertias will have similar secondary moment of inertias as the mirror assembly to be controlled. Despite large angular accelerations, this implementation will substantially not transfer reaction forces to the base to which the assembly attaches.

Figure 10:
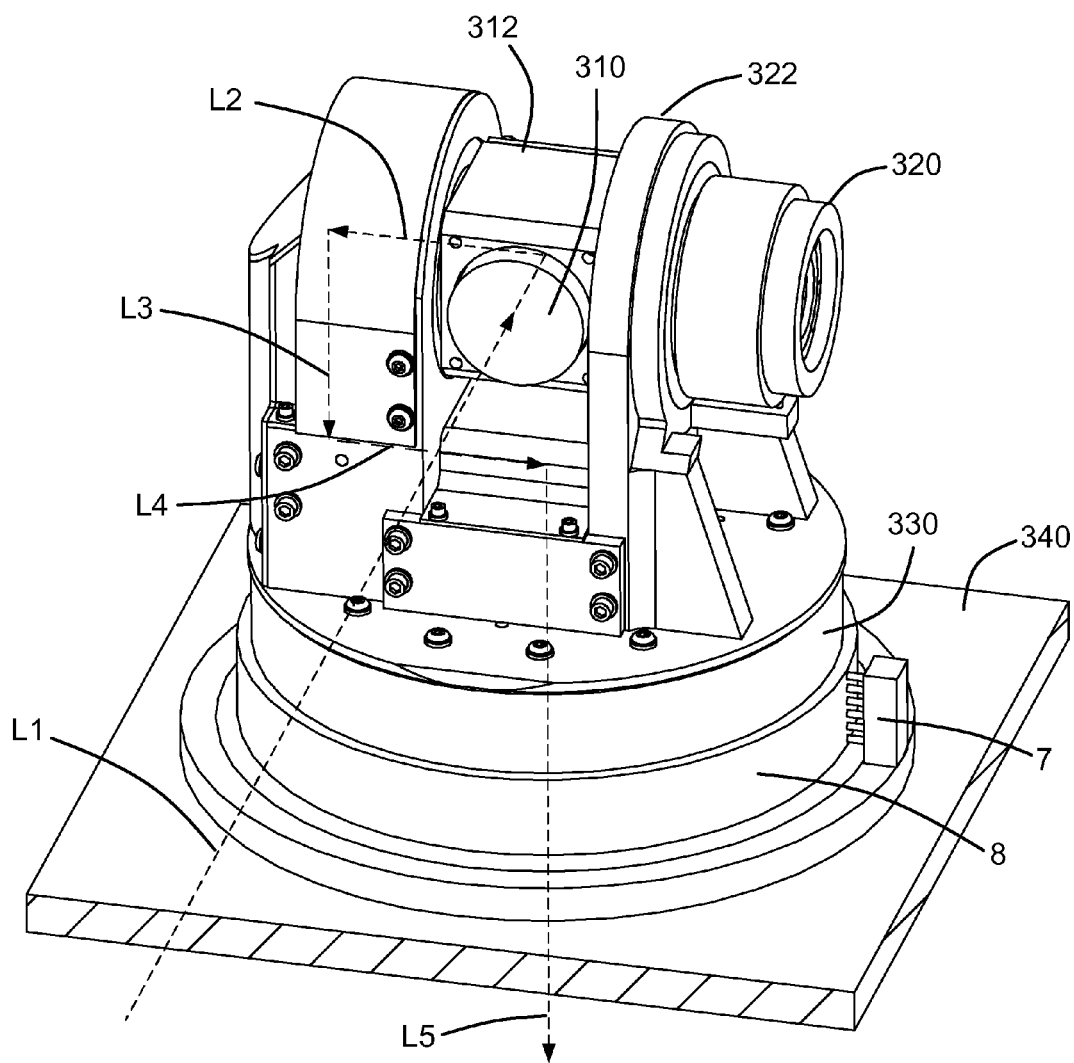
FIG. 10 is a perspective view of an optical beam steering device with an elevation axis combined with an azimuth axis, with motors of the invention incorporated.

FIG. 10 is an optical beam steering system consisting of two rotation axes. The optical topology provides for steering of the optical beam in azimuth and elevation while the optical beam's sensor does not move. Focusing optics 310 are schematically shown. This telescope topology is often ascribed the term "coude" where coude is taken from the French word for elbow or bend. Coude telescopes are well known and variations of the optical relay system exist such as discussed in U.S. Pat. No. 4,395,095.

As shown, the incoming light L1 hits the focusing optic 310, which can be refractive or reflective. The general description can include multiple focusing optics along the beam path, although the drawing omits them for the purpose of describing the basic beam path. The light strikes a mirror that is mechanically connected to the elevation spindle 312, which spins to deviate the beam L2 substantially down the elevation axis of rotation. Three more beams L3, L4, L5 due to reflections are shown where beam path L5 is substantially down the rotation axis of the azimuth stage. The mirrors that produce the turns for beams L3, L4, and L5 spin with the azimuth stage. The axes are driven by motors 320 and 330 for the elevation and azimuth axes respectively. More particularly, motor 320 transmits torque to the spindle 312, which is supported by bearings in the housing 322. The topology provides optical beam steering in 360 degrees in azimuth and a wide angle in elevation, where the elevation viewing angle is only limited by obstructions such as by the housing 322 or base 340.

It is desirable to be able to steer an optical beam over wide viewing angles quickly without exciting base vibrations. Furthermore, the optical instruments are attached to the base 340 and the base vibrations can cause sensing errors due to displacements in the optical path. Additionally, vibration isolation mounts that would be necessary for optical instruments in a high disturbance environment such as moving aircraft, boats, or ground vehicles, can excessively rock under desirable angular acceleration profiles.

A system where the azimuth and elevation axes are designed with high resonant frequency and the reaction force compensating motors of this invention applied to motors 320 and 330 is therefore a solution to achieve high angular accelerations and maintain the necessary precision. Such a need occurs in remote sensing when high resolution images are required over a wide area. More specifically for step-stare applications, the step angle is approximately on the order of the focal plane field of view, which can be on the order of 1 degree to 10 degrees for high resolution imaging. Because the field of view is limited, being able to step the pointing between exposures enlarges the field of view while preserving the high resolution. Increasing the number of exposures per second allows increases in the area coverage rate and/or multiple look angles from moving platforms. Furthermore, it allows increases in update rates, which are useful for observing changing scenes, from loitering platforms. The images can be acquired by active and/or passive sensors.

For fast angular acceleration applications the secondary moment of inertia of the nominally moving motor member will be on the same order of magnitude as the parts to be accelerated. The rejection of reaction forces on the azimuth axis will be especially important because its secondary moment of effective inertia will be larger than those of the elevation axis. Meanwhile, the motor embodiment on the elevation axis has an additional beneficial dynamic property, namely preventing exciting modes of vibration on the azimuth moving parts, particularly the bending modes of vibration about the azimuth axis.

The system also has a desirable property of offloading the sensor mass and secondary moment of inertia. Therefore it is attractive for high angular acceleration applications where the motor torque requirements increase with secondary moment of inertia. Light weighting the moving components is beneficial to the total system mass and secondary moment of inertia. Furthermore, the system will have the same angular acceleration performance regardless of sensor size or weight because the sensors are not on the moving parts. Additionally, it enables some laser applications where the laser is too big to move for practical purposes.

The incorporation of an image rotator, such as the well known k-mirror or dove prism variety, can also be incorporated to control the rotation where the image rotator is driven by a motor of the invention. The moving parts of the coudé path telescope should be of high resonant frequency to obtain the best performance. The axes should be statically and dynamically balanced. Similarly, for both the azimuth axis and the elevation axis, the mass distribution of the associated moving parts should result in a center of mass that lies on the axis of rotation and that rotation axis should be a principle moment of inertia. Because the parts that are required to move are few in the coude topology, the size and dynamic response of the system can be favorable. The dynamic performance can also be extended by using piezoelectric or electro-magnetic actuators to compensate for displacements. Furthermore, the angular acceleration profile can be designed to substantially absorb the vibrations of the moving parts.

Particular motors in accordance with the invention generate higher electromotive force (EMF) than a motor with a non-counter rotating member. Therefore, the motors require extra energy input to reach the same speed. Extra energy, however, is stored as kinetic energy in the counter rotating parts. Rather than dissipate the kinetic energy stored in the rotating and counter-rotating inertia during braking, some of that energy can be stored and re-used.

Figure 11:
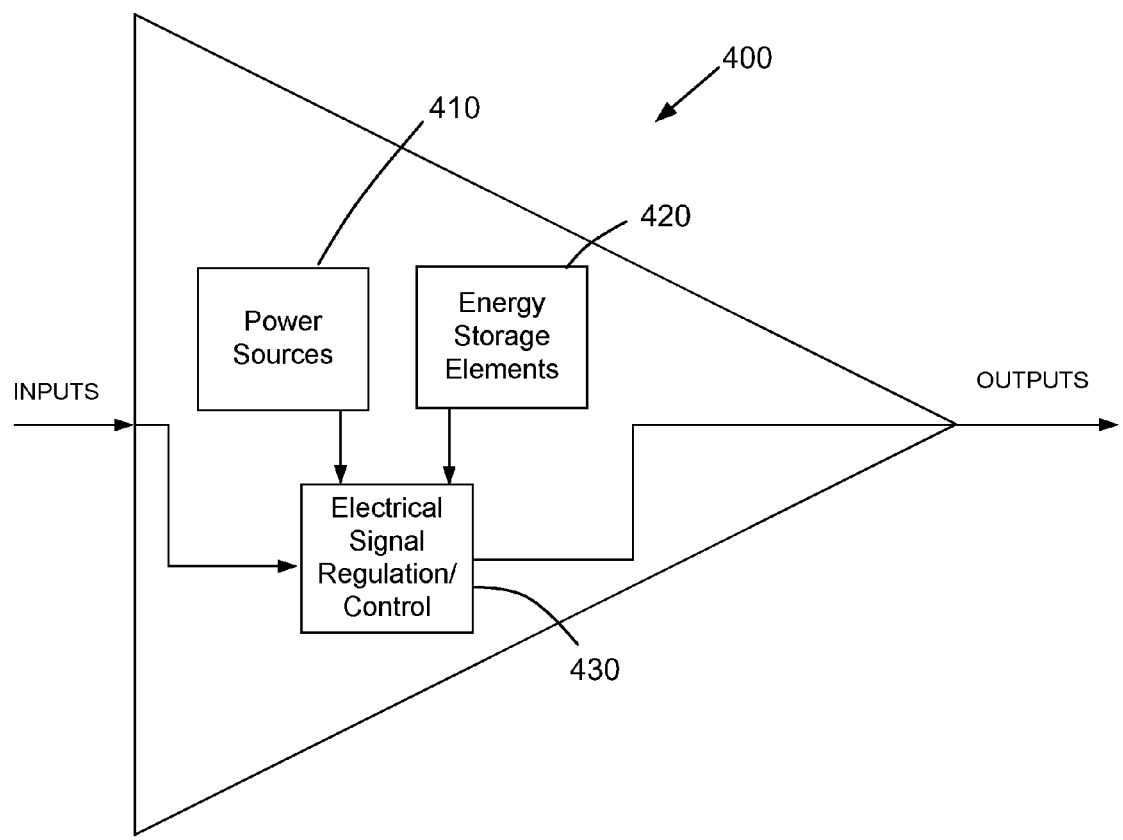
FIG. 11 is a block diagram of a simplified regenerative amplifier utilizing energy storage.

FIG. 11 is a block diagram of a simplified regenerative amplifier utilizing energy storage. As shown, a regenerative amplifier 400 includes conventional power sources 410 and energy storage elements 420, the use of which are managed by an electrical signal regulation and control unit 430. The regenerative amplifier 400 can be used in place of the amplifier 96 shown in FIG. 2.

More particularly, the energy storage elements 420 can be capacitors or rechargeable batteries, but can also be flywheel devices or otherwise. The power sources 410 are typically electrical power supplies or batteries. The electrical signal regulation and control unit 430 receives INPUTS for commutation, which are typically voltage commands, and supplies OUTPUTS, which are typically currents proportional to the input voltages. The electrical signal regulation and control unit 430 controls the OUTPUTS and contains fast switching power transistors to switch between power sources 410 and energy storage elements 420 based on the voltage and current states of the commutation phases.

During braking, when power can be supplied as a result of the motor back-EMF exceeding the ohmic voltage drop, the electrical signal regulation and control unit 430 selects the energy storage elements 420 to sink the power. When the motor requires power input and the energy available in the energy storage elements 420 exceeds a threshold value, the electrical signal regulation and control unit 430 selects the energy storage elements 420 to source power. Otherwise, the power is supplied by the power sources 410. Furthermore, in periodic, high-output current applications, the electrical signal regulation and control unit 430 can select to charge the energy storage elements 420 during times when excess power is available in order to increase the current capacity of the system during accelerations.

Applications that would benefit from recovering the kinetic energy in the counter-rotating parts include those where power efficiency and low heat dissipation are beneficial. Furthermore, the electrical storage elements allow larger currents than those available from the power supply 410 alone and thus can offer increased output power capacity, such as during high accelerations, and increased power sinking capacity, such as during fast braking. In fact, the motors of this invention with the regenerative amplifier 400 can be more efficient than motors that do not recover kinetic energy. Furthermore, the use of the regenerative amplifier 400 provides the further benefit of reduced current capacity of the power supplies and lower heat dissipation with the associated benefits of thermal stability and less space required for heat sinking.

A particular advantage of embodiments of the invention is that the reaction mass can be integrated as a counter rotating motor member. The result of the counter-rotating motor member to substantially freely spin in this invention unexpectedly allows the parts driven by the rotating motor member to achieve precision control requirements with higher angular accelerations. Furthermore, it was found that a motor with modest additional size and mass can have no reaction force on the base despite having high angular accelerations. Additionally, the invention is superior to conventional approaches because relatively small additional size and mass is required and high structural stiffness is achievable. The regeneration of electricity during changes in angular velocity achieves higher accelerations and improved power efficiency despite the additional frictional losses due to the counter-rotating motor member. The insight of combining the reaction force cancelling member into the motor and providing for runaway prevention, electrical conductivity, and full range of motion capability is another particular advantage of the invention.

While this invention has been particularly shown and described with references to particular embodiments, it will be understood by those skilled in the art that various changes in form and details may be made to the embodiments without departing from the scope of the invention encompassed by the appended claims. For example, various features of the embodiments described and shown can be omitted or combined with each other.

I claim:

1. A motor assembly, comprising:
   a base;
   a motor comprising:
      a first movable motor member mechanically isolated from the base by a first bearing arrangement and responsive to reaction forces applied thereto;
      a second movable motor member disposed relative to the first movable motor member and mechanically isolated from the base by a second bearing arrangement, the second movable motor member being substantially free moving and having a reaction mass to counter movement of the first movable motor member;
   a work element secured to the first movable motor member; and
   a control system for applying a reaction force to the first movable motor member, the reaction force calculated to move the work element from a first position to a second position, where the reaction force includes a factor for the reaction mass of the second movable motor member and wherein the reaction force yields a linear acceleration of at least 1 g at a portion of the work element.

2. The motor assembly of claim 1 wherein the first movable motor member is electromagnetically coupled to the second movable motor member.

3. The motor assembly of claim 1 wherein the first movable motor member is a rotatable motor member and the second movable motor member is a counter-rotatable motor member.

4. The motor assembly of claim 1 wherein the work element includes one of a table or a shaft.

5. The motor assembly of claim 1 wherein the control system comprises a position measurement system for measuring the relative positions of the work element and the second movable motor member.

6. The motor assembly of claim 5 wherein the position measurement system includes:
   a first position sensor that measures the position of the work element with respect to the base; and
   a second position sensor that measures the position of the second movable motor member with respect to the base.

7. The motor assembly of claim 6 wherein the first position sensor is a precision position sensor.

8. The motor assembly of claim 5 wherein the control system further comprises a signaling system responsive to the position measurement system to provide drive signals to the second movable motor member to affect torque to the first movable motor member.

9. The motor assembly of claim 8 wherein the signaling system computes commutation phase from the relative positions.

10. The motor assembly of claim 8 wherein the signaling system includes an electrical energy storage element for storing electrical energy generated by countering the reaction force.

11. The motor assembly of claim 10 wherein stored electrical energy is applied to the drive signals.

12. The motor assembly of claim 1 wherein the work element incrementally moves within a range of movement that is less than one cycle.

13. The motor assembly of claim 1 wherein the control system comprises a torque resistance level on the second movable motor member that exceeds a torque resistance level on the first movable motor member to inhibit runaway of the second movable motor member.

14. An electromagnetic wave pointing system comprising:
   a structural frame;
   a motor assembly, comprising:
      a base mechanically coupled to the structural frame;
      a motor comprising:
         a first movable motor member mechanically isolated from the base by a first bearing arrangement and responsive to reaction forces applied thereto;
         a second movable motor member disposed relative to the first movable motor member and mechanically isolated from the base by a second bearing arrangement, the second movable motor member being substantially free moving and having a reaction mass to counter movement of the first movable motor member;
      an electromagnetic wave pointing device mechanically coupled to the first movable motor member; and
      a control system for applying a reaction force to the first movable motor member, the reaction force calculated to move the electromagnetic wave pointing device from a first position to a second position, where the reaction force includes a factor for the reaction mass of the second movable motor member and wherein the reaction force yields a linear acceleration of at least 1 g at a portion of the electromagnetic wave pointing device.

15. The system of claim 14 wherein the electromagnetic wave pointing device includes an optical element.

16. The system of claim 14 wherein the electromagnetic wave pointing device includes a microwave antenna.

17. The system of claim 14 wherein the first movable motor member is electromagnetically coupled to the second movable motor member.

18. The system of claim 14 wherein the first movable motor member is a rotatable motor member and the second movable motor member is a counter-rotatable motor member.

19. The system of claim 14 wherein the electromagnetic wave pointing device is mechanically coupled to the first movable motor member by one of a table or a shaft.

20. The system of claim 14 wherein the control system comprises a position measurement system for measuring the relative positions of the electromagnetic wave pointing device and the second movable motor member.

21. The system of claim 20 wherein the position measurement system includes:
   a first position sensor that measures the position of the electromagnetic wave pointing device with respect to the base; and
   a second position sensor that measures the position of the second movable motor member with respect to the base.

22. The system of claim 21 wherein the first position sensor is a precision position sensor.

23. The system of claim 20 wherein the control system further comprises a signaling system responsive to the position measurement system to provide drive signals to the second movable motor member to affect torque to the first movable motor member.

24. The system of claim 23 wherein the signaling system computes commutation phase from the relative positions.

25. The system of claim 23 wherein the signaling system includes an electrical energy storage element for storing electrical energy generated by countering the reaction force.

26. The system of claim 25 wherein stored electrical energy is applied to the drive signals.

27. The system of claim 14 wherein the electromagnetic wave pointing device incrementally moves within a range of movement that is less than one cycle.

28. The system of claim 14 wherein the electromagnetic wave pointing device rotates within a range of movement of less than about 10 degrees.

29. The system of claim 14 wherein the control system comprises a torque resistance level on the second movable motor member that exceeds a torque resistance level on the first movable motor member to inhibit runaway of the second movable motor member.

30. A method of assembling a motor assembly, comprising:
fabricating a base;
assembling a motor, comprising:
mechanically isolating a first movable motor member from the base by a first bearing arrangement;
configuring the first movable motor member to receive reaction forces applied thereto;
disposing a second movable motor member relative to the first movable motor member and mechanically isolated from the base by a second bearing arrangement, such that the second movable motor member is substantially free moving, the second movable motor member having a reaction mass to counter movement of the first movable motor member;
securing a work element to the first movable member; and
coupling a control system for applying a reaction force to the first movable motor member, the reaction force calculated to move the work element from a first position to a second position, where the reaction force includes a factor for the reaction mass of the second movable motor member and wherein the reaction force yields a linear acceleration of at least 1 g at a portion of the work element.

31. The method of claim 30 further comprising electromagnetically coupling the first movable motor member to the second movable motor member.

32. The method of claim 30 wherein the first movable motor member is a rotatable motor member and the second movable motor member is a counter-rotatable motor member.

33. The method of claim 30 wherein coupling the control system comprises assembling a position measurement system for measuring the relative positions of the work element and the second movable motor member.

34. The method of claim 33 wherein assembling the position measurement system includes:
assembling a first position sensor that measures the position of the work element with respect to the base; and
assembling a second position sensor that measures the position of the second movable motor member with respect to the base.

35. The method of claim 33 wherein coupling the control system comprises coupling a signaling system responsive to the position measurement system to provide drive signals to the second movable motor member to affect torque to the first movable motor member.

36. The method of claim 35 further comprising providing the signaling system with logic to compute commutation phase from the relative positions.

37. The method of claim 35 further comprising coupling the signaling system with an electrical energy storage element for storing electrical energy generated by countering the reaction force.

38. The method of claim 37 further comprising coupling stored electrical energy to the drive signals.

39. The method of claim 30 wherein coupling the control system comprises defining a torque resistance level on the second movable motor member that exceeds a torque resistance level on the first movable motor member to inhibit runaway of the second movable motor member.

40. The motor assembly of claim 1 wherein the linear acceleration is at least 100 g.

41. The motor assembly of claim 1 wherein the linear acceleration is at least 10 g.

42. The motor assembly of claim 1 wherein the control system positions the work element within 0.00016% of the second position relative to a cycle of the work element.

43. The system of claim 14 wherein the linear acceleration is at least 100 g.

44. The system of claim 14 wherein the linear acceleration is at least 10 g.

45. The system of claim 14 wherein the control system positions the electromagnetic wave pointing device within 0.00016% of the second position relative to a cycle of the electromagnetic wave pointing device.

46. The method of claim 30 wherein the linear acceleration is at least 100 g.

47. The method of claim 30 wherein the linear acceleration is at least 10 g.

48. The method of claim 30 wherein the control system positions the work element within 0.00016% of the second position relative to a cycle of the work element.

* * * * *